(12) United States Patent
Masumoto et al.

(10) Patent No.: US 11,738,980 B2
(45) Date of Patent: Aug. 29, 2023

(54) CAPPING MACHINE

(71) Applicant: SHIBUYA CORPORATION, Kanazawa (JP)

(72) Inventors: Satoshi Masumoto, Kanazawa (JP); Hajime Matsui, Kanazawa (JP); Yasuto Nishide, Kanazawa (JP); Hiroyoshi Yamada, Kanazawa (JP); Hiroaki Kitamoto, Kanazawa (JP); Masatoshi Nozaki, Kanazawa (JP)

(73) Assignee: SHIBUYA CORPORATION, Kanazawa (JP)

( * ) Notice: Subject to any disclaimer, the term of this patent is extended or adjusted under 35 U.S.C. 154(b) by 15 days.

(21) Appl. No.: 17/316,729

(22) Filed: May 11, 2021

(65) Prior Publication Data
US 2021/0347620 A1    Nov. 11, 2021

(30) Foreign Application Priority Data

May 11, 2020 (JP) .................................. 2020-083103

(51) Int. Cl.
*B67B 3/20* (2006.01)

(52) U.S. Cl.
CPC ............ *B67B 3/206* (2013.01); *B67B 3/2066* (2013.01)

(58) Field of Classification Search
CPC ..... B67B 3/2066; B67B 3/2013; B67B 3/206; B67G 47/847
See application file for complete search history.

(56) References Cited

FOREIGN PATENT DOCUMENTS

| DE | 10 2006 012 020 | | 9/2007 | | |
|---|---|---|---|---|---|
| JP | 2003-200997 | | 7/2003 | | |
| JP | 4232425 | B2 | 4/2004 | | |
| JP | 4232425 | A * | 12/2008 | ............ | B67B 3/206 |
| JP | 5315731 | B2 | 10/2009 | | |
| JP | 2015054724 | A * | 3/2015 | ............... | B67B 3/20 |
| JP | 2018-183847 | | 11/2018 | | |
| WO | WO 2008/007414 | | 1/2008 | | |

OTHER PUBLICATIONS

Extended European Search Report for corresponding EP Application No. 21173012.2-1017, dated Oct. 7, 2021.

* cited by examiner

*Primary Examiner* — Thomas M Wittenschlaeger
(74) *Attorney, Agent, or Firm* — MORI & WARD, LLP (57) ABSTRACT

A capping machine includes a gripper having a pair of gripping arms provided on an outer peripheral portion of a rotating body and configured to grip a cylindrical portion of a vessel, an opening and closing device configured to open and close the gripping arms, and a capping head liftably and rotatably provided on the rotating body. The gripping arms are arranged symmetrically with respect to a radius of the rotating body. The gripper has a protrusion for preventing the vessel from rotating on a vessel gripping surface of the gripping arms. The gripping arms have outer and inner gripping surfaces which are connected in a V shape. The protrusion is formed only on the inner gripping surface of a right gripping arm. A cap held by the capping head is screwed onto the vessel while sticking the protrusion into the cylindrical portion.

2 Claims, 6 Drawing Sheets

CAPPING MACHINE

CROSS-REFERENCE TO RELATED APPLICATIONS

The present application claims priority under 35 U.S.C. § 119 to Japanese Patent Application No. 2020-083103, filed May 11, 2020. The contents of this application are incorporated herein by reference in their entirety.

BACKGROUND OF THE INVENTION

1. Field of the Invention

The present invention relates to a capping machine.

2. Description of the Related Art

There is known a capping machine that screws a screw cap while gripping the neck of a vessel by a gripper. The gripper is provided with a plurality of protrusions on the gripping surface of the gripper so that the protrusions stick in the neck portion of the vessel to prevent the vessel from rotating. For example, a capping machine is known that includes a pair of gripper pieces each having a V-shaped inner surface to configure four gripping surfaces for gripping a neck portion. Each of the three gripping surfaces is provided with one protrusion to restrict a co-rotation of a vessel when screwing on a cap. See Japanese Patent No. 4232425.

However, with the configuration disclosed in Japanese Patent No. 4232425, the protrusion provided on the gripping surface on the tip side of the neck gripper may come into contact with the vessel and make scratches on the vessel when either receiving the vessel from the supply wheel or delivering the vessel to the discharge wheel. Furthermore, if the protrusions engage with the vessel at improper positions when gripping the vessel, the vessel will not be properly centered and a capping failure could occur.

To solve such a problem, a gripper is proposed that is provided with a support member extending outward from between the gripper pieces and having protrusions at the tip end. See Japanese Patent No. 5315731. In this configuration, the neck portion of the vessel gripped by the gripper is pressed against the tip end of the support member, and the protrusions of the support member stick into the neck portion so that the co-rotation of the vessel is restricted.

SUMMARY OF THE INVENTION

According to one aspect of the present invention, a capping machine includes a gripper having a pair of gripping arms provided on an outer peripheral portion of a rotating body and configured to grip a cylindrical portion on a lower side of a flange portion of a vessel, an opening and closing device configured to open and close the pair of gripping arms, and a capping head liftably and rotatably provided on the rotating body. The pair of gripping arms are arranged symmetrically with respect to a radius of the rotating body. The gripper has a protrusion for preventing the vessel from rotating on a vessel gripping surface of the pair of gripping arms. Each of the pair of gripping arms has an outer gripping surface and an inner gripping surface which are connected in a V shape. The protrusion is formed only on the inner gripping surface of a right gripping arm of the pair of gripping arms located on a right side when viewed from a center of the rotating body. A cap held by the capping head is screwed onto the vessel while sticking the protrusion into the cylindrical portion.

BRIEF DESCRIPTION OF THE DRAWINGS

The objects and advantages of the present invention may be better understood from the following description with references to the accompanying drawings in which.

DESCRIPTION OF THE PREFERRED EMBODIMENTS

Figure 1:
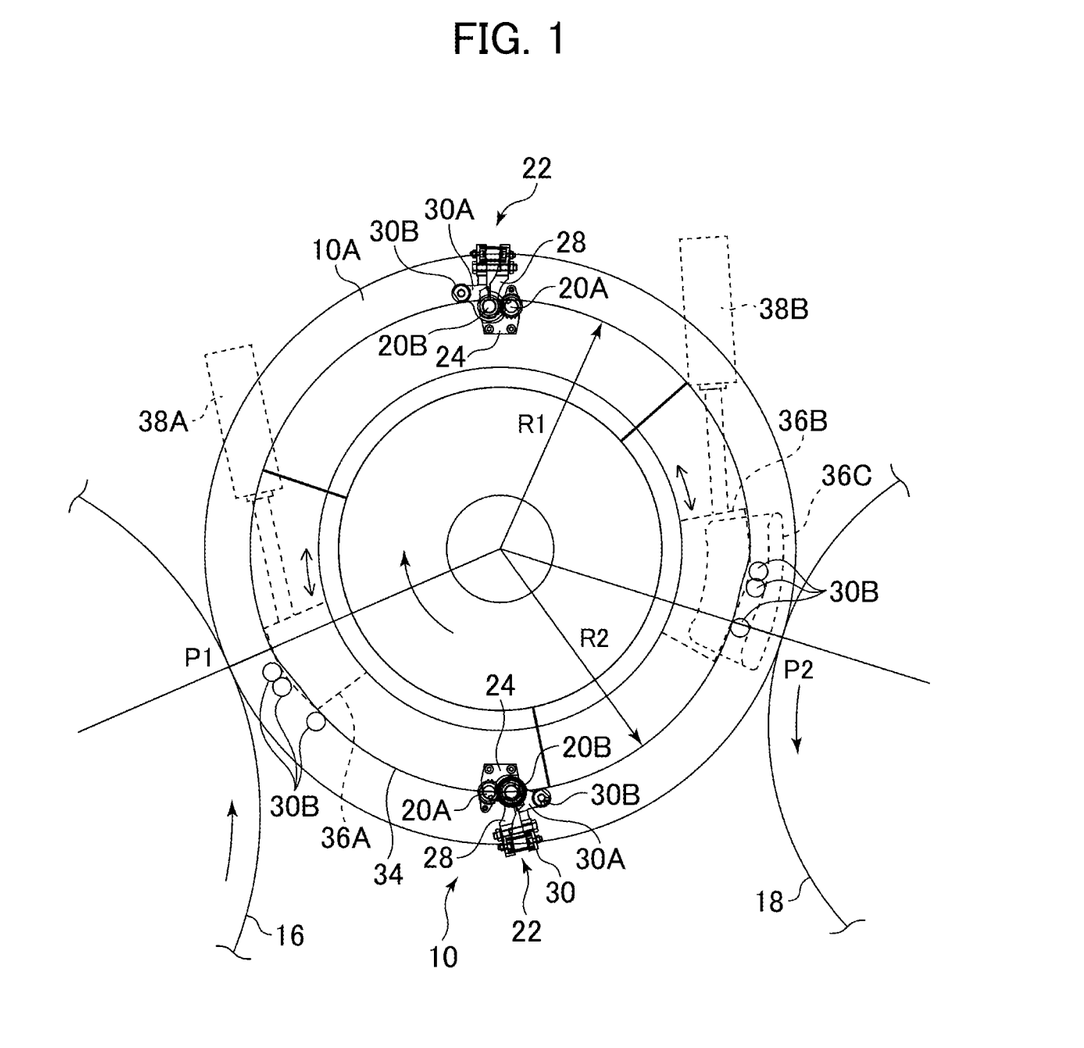
FIG. 1 is a plan view of a capping machine of an embodiment of the present invention.
Figure 2:
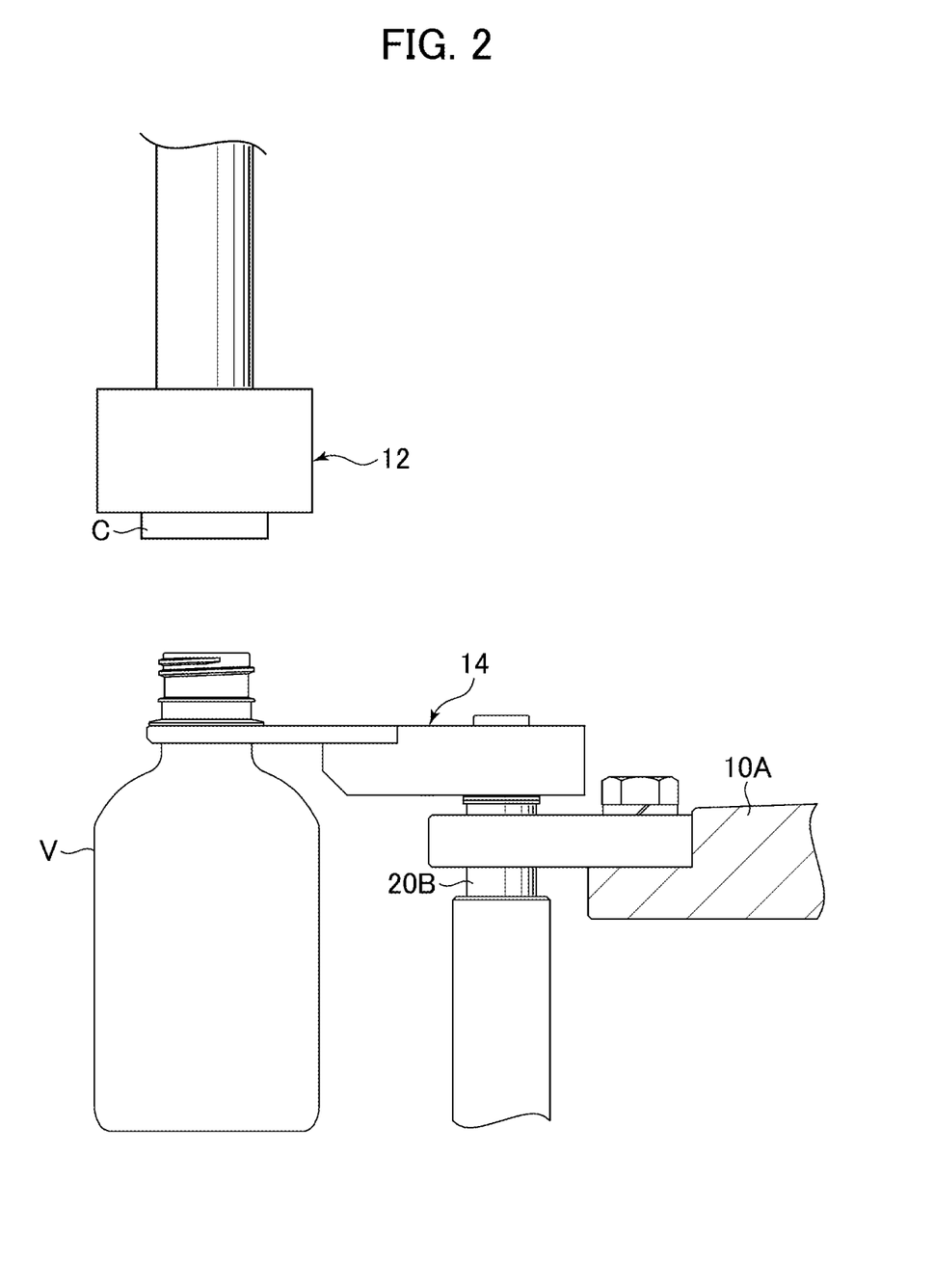
FIG. 2 is a side view around a capping head and a neck gripper provided along the capping machine.

The embodiments of the present invention are described below with references to examples shown in the drawings. FIG. 1 is a plan view of a capping machine, which is an embodiment of the present invention. FIG. 2 is a side view around a capping head and a neck gripper that is provided along the outer periphery of the capping machine illustrated in FIG. 1.

The capping machine 10 of the present embodiment may be a rotary-type machine. The capping machine 10 includes a rotary wheel (a rotating body) 10A provided with numerous pairs of upper capping heads 12 and lower neck grippers 14 along its outer periphery at a predetermined interval. A cap/vessel supply wheel 16 and a discharging wheel 18 are arranged in two stages—upper and lower-adjacent to the capping machine 10. At a receiving position P1, caps C are supplied from the upper stage to the capping head 12 and vessels V are supplied from the lower stage to the neck gripper 14.

A cap C and vessel V pair supplied to the capping machine 10 is moved along the periphery of the rotary wheel 10A as the rotary wheel 10A is rotated. The capping head 12 is configured to be liftable and rotatable. A cap C is screwed onto the mouth of a vessel V when the capping head 12, which is positioned right above the vessel V held by the neck gripper 14, is lowered while rotating. The vessel V that has been capped is delivered to the discharging wheel 18 at a delivery position P2.

As a plan view of the neck gripper 14 illustrates in FIG. 3, the neck gripper includes a pair of gripping arms 14A and 14B. Each base portion of the gripping arms 14A and 14B is integrally attached to the top ends of vertical rotating shafts 20A and 20B rotatably supported at the outer periphery of the rotary wheel 10A. The bottom ends of the rotating shafts 20A and 20B are attached to a gripper opening and closing device (an opening and closing mechanism) 22, see FIG. 5.

Figure 4:
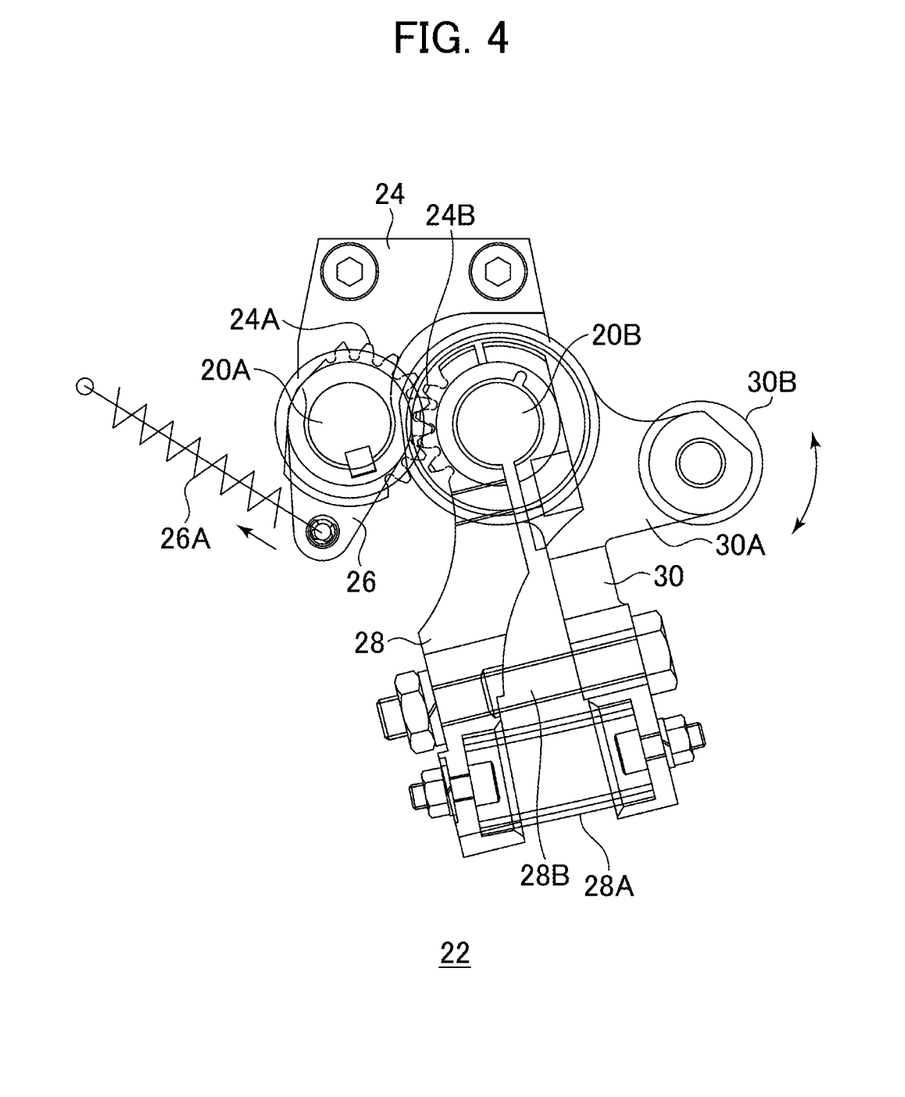
FIG. 4 is a plan view of a gripper opening and closing device.
Figure 5:
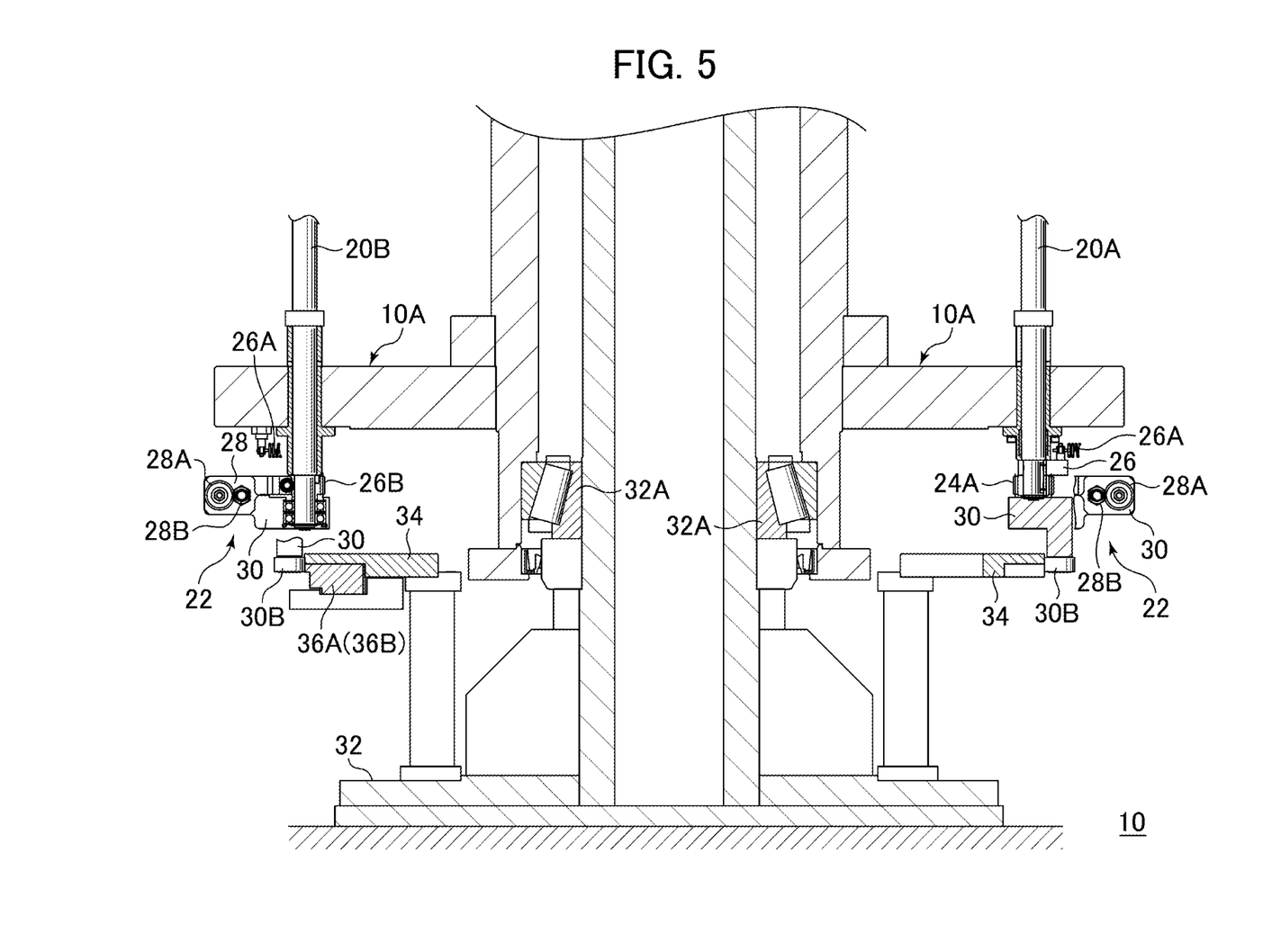
FIG. 5 is a side sectional view of the capping machine.

FIG. 4 is a plan view of the gripper opening and closing device 22. FIG. 5 is a side sectional view of the capping machine 10. The bottom ends of the rotating shafts 20A and 20B of the gripper opening and closing device 22 are journaled to a base plate 24, which is fixed to the rotary wheel 10, and are provided with gears 24A and 24B, which have identical diameters and engage with each other. The rotating shafts 20A and 20B rotate in the opposite direction through their engagement and thereby, the gripping arms 14A and 14B attached to the upper ends of the rotating shafts 20A and 20B, respectively, swing around their base ends so that their tips open and close.

The bottom end of the rotating shaft 20A is provided with a first lever 26, which is fixedly attached. The tip of the first lever 26 is biased by a first spring 26A to rotate the rotating shafts 20A and 20B in the direction to open the gripping arms 14A and 14B.

On the other hand, the bottom end of the rotating shaft 20B is provided with a second lever 28, which is fixedly attached, and a third lever 30, which is rotatably attached. A compressed second spring 28A is interposed between the second lever 28 and the third lever 30 so that the levers 28 and 30 are biased in a direction away from each other. Furthermore, a stopper 28B is also interposed between the second lever 28 and the third lever 30 to regulate the distance between the second lever 28 and the third lever 30 within a predetermined range. Accordingly, the second lever 28 and the third lever 30 integrally rotate with the rotating shaft 20B and maintain a positional relationship regulated by the stopper 28B unless a compressive force larger than the biasing force of the second spring 28A is applied there between.

Furthermore, the third lever 30 is integrally provided with a laterally extending cam lever 30A. On the tip of the cam lever 30A, there is attached a cam follower 30B which is rotatable about a vertical axis. As shown in FIG. 5, the cam follower 30B travels along the entire circumference of the rotary wheel 10A, on either of a cam surface of a fixed cam 34 provided on the fixed portion 32 of the capping machine 10 or cam surfaces of movable cams 36A and 36B partially provided along the fixed cam 32 about the receiving position P1 and the delivery position P2. The rotary wheel 10A, to which the gripper opening and closing device 22 is attached, is rotatably supported by the fixed portion 32 via the bearing 32A and is rotated at a predetermined speed by a drive unit (not shown).

In FIG. 1, the fixed cam 34 is depicted by a solid line, and the movable cams 36A and 36B are depicted by broken lines. The movable cams 36A and 36B can be reciprocated a predetermined distance along the fixed cam 34 by, for example, the fluid cylinders 38A and 38B. The positions of the movable cams 36A and 36B are adjusted according to the size of the outer diameter of the vessel V handled by the capping machine 10.

In FIG. 1, two gripper opening and closing devices 22 are illustrated, for example, as are three positions of cam followers 30B engaged with the movable cams 36A and 36B, respectively. As can be seen from FIGS. 1 and 4, in the capping machine 10 of the present embodiment, the neck gripper 14 is closed when the cam follower 30B is urged radially outward by the cam, and the neck gripper 14 is opened when the cam follower 30B is moved radially inward by the cam.

The fixed cam 34 has a radius R1 along the direction of rotation of the rotary wheel 10A over a predetermined section approximately from receiving position P1 to a position before it reaches the delivery position P2. The diameter of the fixed cam 34 is gradually reduced to a radius R2 smaller than the radius R1 before it reaches the delivery position P2. The diameter is then gradually expanded to the radius R1 before it reaches the receiving position P1. Thereby, the neck gripper 14 is maintained in the closed state while the cam follower 30B engages with the fixed cam 34 with the radius R1, and in the open state while the cam follower 30B engages with the fixed cam 34 with the radius R2.

The movable cams 36A and 36B each include a section having a cam surface with a radius R1 of the fixed cam 34 and a section having a cam surface with a radius R2 of the fixed cam 34; both sections are smoothly connected. Namely, when the movable cam 36A is moved upstream (counterclockwise in FIG. 1) by the fluid cylinder 38A, the neck gripper 14 starts to close relatively early, so that the neck gripper 14 is adjusted to handle vessels V having a small neck diameter. When the movable cam 36A is moved downstream (clockwise in FIG. 1) by the fluid cylinder 38A, the neck gripper 14 starts to close relatively late, so that the neck gripper 14 is adjusted to handle vessels V having a large neck diameter.

On the other hand, when the movable cam 36B is moved downstream (clockwise in FIG. 1) by the fluid cylinder 38B, the neck gripper 14 starts to open relatively late, so that the neck gripper 14 is adjusted to handle vessels V having a small neck diameter. When the movable cam 36B is moved upstream (counterclockwise in FIG. 1) by the cylinder 38B, the neck gripper 14 starts to open relatively early, so that the neck gripper 14 is adjusted to handle vessels V having a large neck diameter.

As illustrated in FIG. 1, a gripper opening cam 36C is integrally provided on the outside of the movable cam 36B of the present embodiment. Accordingly, the cam follower 30B travels between the movable cam 36B and the gripper opening cam 36C in this section. The gripper-opening cam 36C is a cam for forcibly moving the cam follower 30B radially inward (toward radius R2) to force open the neck gripper 14. The gripper-opening cam 36C is provided in preparation for a situation when the neck gripper 14 cannot be opened by only the biasing force of the first spring 26A due to protrusions 46 biting into the vessel V for preventing the rotation of the vessel V, which will be discussed later.

Furthermore, the opening degree of the neck gripper 14 varies according to the neck diameter of the vessel V being gripped. However, in the present embodiment, the height of the cam surface that keeps the neck gripper 14 in the closed state is the same regardless of the type of vessel V handled. Therefore, a mechanism for adjusting the opening degree according to the neck diameter of the vessel V is required. In the gripper opening and closing device 22 of the present embodiment, the second and third levers 28 and 30 are biased by the second spring 28A to separate levers 28 and 30 from each other, and thereby, the opening degrees of the neck gripper 14 are adjusted according to the neck diameter of the vessel V.

For example, when they are not gripping a vessel V, the second and third levers 28 and 30 are integrally rotated about the rotating shaft 20B along with the movement of the cam follower 30B, which is urged radially outward by the movable cam 36A, until the cam follower 30B reaches the radius R1, in the direction closing the neck gripper 14.

On the other hand, when gripping a vessel V having a relatively large neck diameter, the second and third levers 28 and 30 are initially rotated integrally about the rotating shaft 20B along with the movement of the cam follower 30B as the neck gripper 14 starts to close. However, when each gripping surface of the neck gripper 14 comes into contact with the neck portion of the vessel V, the movement of the neck gripper 14 is stopped. As a result, the rotation of the second lever 28 is also stopped. However, the third lever 30 integrally provided with the cam lever 30A continues rotating while compressing the second spring 28A until the cam follower 30B reaches the radius R1. Accordingly, the gripper opening and closing device 22 of the present embodiment enables the neck gripper 14 to grip even vessels having different neck diameters properly according to the size of the vessel.

The pair of gripping arms 14A and 14B of the neck gripper 14 are arranged symmetrically with respect to the radius of the rotary wheel 10A. As illustrated in FIG. 3, the gripping arms 14A and 14B of the present embodiment are provided with gripping members 40A and 40B, which are facing each other, on inside surfaces of the tip portions of the gripping members 40A and 40B. The gripping members 40A and 40B are each formed in a V shape, and are attached to the gripping arms 14A and 14B so that the V-shaped recessed portions face each other.

Figure 3A:
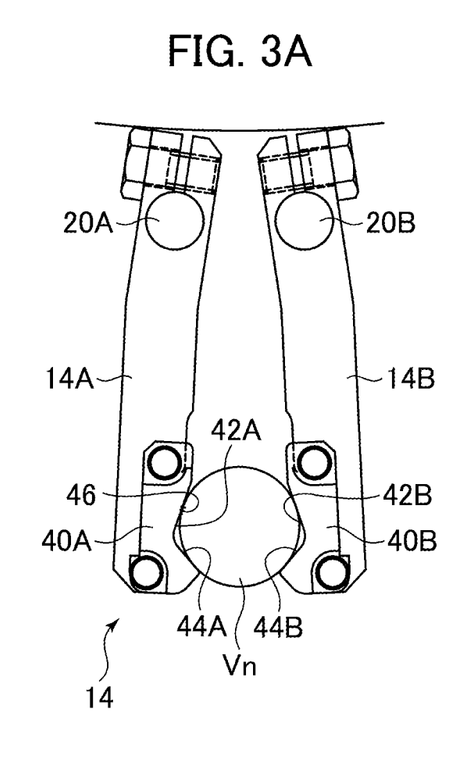
FIG. 3A is a plan view of the neck gripper gripping a large-diameter vessel.
Figure 3B:
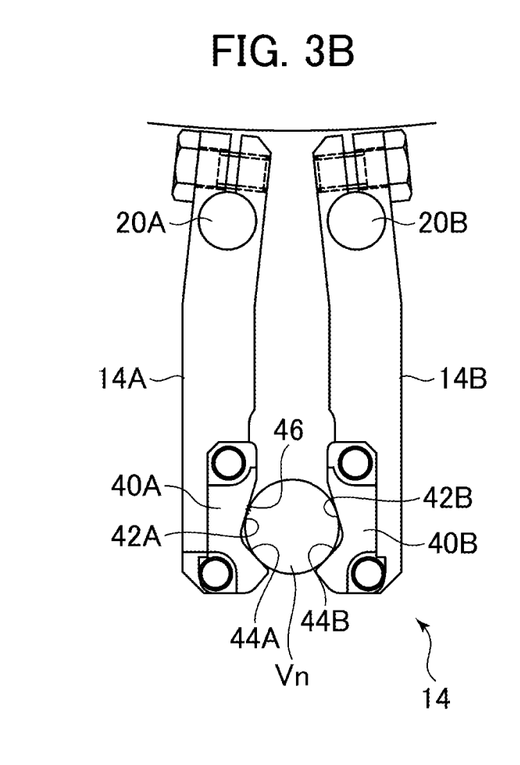
FIG. 3B is a plan view of the neck gripper gripping a small-diameter vessel.

Each of the gripping members 40A and 40B has two inner surfaces (four inner surfaces in total), which are connected to form a V shape. The surfaces on the base sides (the sides closest to the rotating shafts 20A and 20B) of the gripping arms 14A and 14B are referred to as inner gripping surfaces 42A and 42B, and the surfaces on the tip side are referred to as outer gripping surfaces 44A and 44B. When the neck gripper 14 grips the vessel V, a cylindrical neck portion Vn below a flange portion of the vessel V is gripped from four sides by the inner gripping surfaces 42A and 42B and the outer gripping surfaces 44A and 44B. FIG. 3A illustrates a state when a vessel V with neck portion Vn having a relatively large diameter is gripped. FIG. 3B illustrates a state when a vessel V with neck portion Vn having a relatively small diameter is gripped.

In the present invention, at least one protrusion 46 for preventing the gripped vessel V from rotating is provided on only the inner gripping surface 42A of the gripping arm 14A that is located on the right side when viewed from the center of the rotary wheel 10A. In this embodiment, three protrusions 46 are provided on the inner gripping surface 42A along the horizontal direction. When the neck gripper 14 grips the vessel V, the protrusion 46 of the inner gripping surface 42A sticks in the side surface of the neck portion Vn of the vessel V. Accordingly, the vessel V is prevented from rotating together with a cap C that is pressed against the mouth portion of the vessel V, even when the cap C is rotated.

In FIG. 3, the cap C is screwed on in a clockwise direction. As the protrusion 46 is provided on the inner gripping surface 42A, the gripping arm 14A, which is provided with the protrusion 46 sticking in the vessel V, is subjected to a force acting in the direction closing the neck gripper when the vessel V tries to rotate in the clockwise direction along with the cap C. Thereby, the neck gripper 14 is prevented from opening and the vessel V is prevented from separating and falling from the gripper. On the other hand, since the protrusions 46 are not provided on the inner gripping surfaces 42A and the outer gripping surfaces 44A and 44B, the neck portion Vn is prevented from being scratched by the protrusions 46 while delivering the vessel V from or to the neck gripper 14.

Figure 6A:
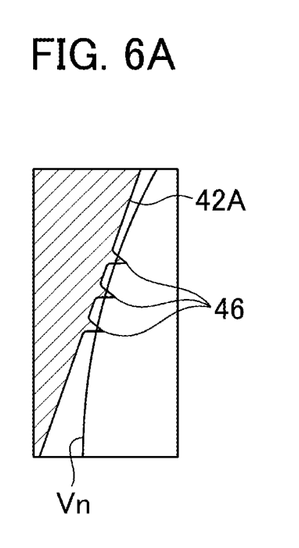
FIG. 6A illustrates the case when protrusions on an inner gripping surface stick in the neck portion of the large-diameter vessel.
Figure 6B:
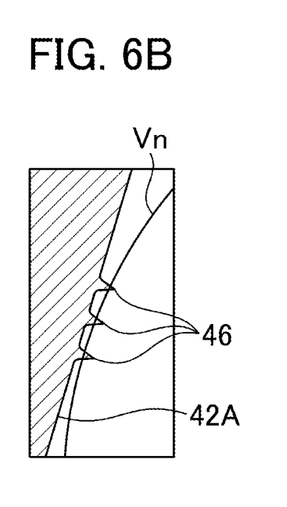
FIG. 6B illustrates the case when protrusions on an inner gripping surface stick in the neck portion of the small-diameter vessel.

FIG. 6 is an enlarged plan view illustrating a state in which the protrusions 46 of the present embodiment are sticking in the outer peripheral surface of the neck portion Vn. FIG. 6A corresponds to the case in which the large-diameter vessel V of FIG. 3A is gripped. FIG. 6B corresponds to the case in which the small-diameter vessel V of FIG. 3B is gripped. As illustrated in FIGS. 6A and 6B, when providing a plurality of protrusions 46 along the horizontal direction, as in the present embodiment, at least one of the protrusions 46 bites deeply into the side surface of the neck portion Vn, even when a contact position between the vessel V and the inner gripping surface 42A changes in response to a variation in the diameter of the neck portion Vn of the vessel V. Thereby, the rotation of the container V is more effectively restricted. In FIGS. 6A and 6B, two of the three protrusions 46 are deeply penetrated in the neck portion Vn regardless of the size of the diameter of the vessel V.

When only one protrusion 46 sticks in the vessel V, it indicates that the protrusion 46 has been subjected to heavy wear, and as the result, it does not stick in the container V. However, if three or more protrusions 46 are provided as in the present embodiment, a plurality of protrusions 46 always stick in the vessel V so that the co-rotation can be stably restricted.

As described above, according to the capping machine of the present embodiment, it is possible to suppress the occurrence of damage to the vessel while easily handling vessels having different diameters.

The invention claimed is:

1. A capping machine comprising:
a gripper having a right gripping arm and a left gripping arm provided on an outer peripheral portion of a rotating body and configured to grip a cylindrical portion on a lower side of a flange portion of a vessel, the rotating body being rotatable around a center of the rotating body;
the right gripping arm being provided on a right side with respect to the left gripping arm when viewed from the center of the rotating body;
an opening and closing device configured to open and close the right and left gripping arms;
a capping head liftably and rotatably provided on the rotating body;
the right and left gripping arms being arranged symmetrically with respect to a radius of the rotating body, each of the right and left gripping arms being rotatable around a respective axis;
the right gripping arm having a gripping surface with a V shape viewed along the respective axis, the gripping surface of the right gripping arm having an outer gripping surface and an inner gripping surface which is connected to the outer gripping surface of the right gripping arm to form the V shape of the right gripping arm, the inner gripping surface of the right gripping arm being provided between the outer gripping surface of the right gripping arm and the axis of the right gripping arm;
the left gripping arm having a gripping surface with a V shape viewed along the respective axis, the gripping surface of the left gripping arm having an outer gripping surface and an inner gripping surface which is connected to the outer gripping surface of the left gripping arm to form the V shape of the left gripping arm, the inner gripping surface of the left gripping arm being provided between the outer gripping surface of the left gripping arm and the axis of the left gripping arm;
only the inner gripping surface of the right gripping arm among the inner and outer gripping surfaces of the right gripping arm and the inner and outer gripping surfaces of the left gripping arm including at least one protrusion to prevent the vessel from rotating; and the capping head holding a cap which is configured to be screwed onto the vessel while sticking the protrusion onto the cylindrical portion.

2. The capping machine according to claim 1, wherein the gripper is configured to grip a vessel having a relatively large or small neck diameter, and wherein the at least one protrusion is provided along a horizontal direction of the inner gripping surface.

* * * * *